United States Patent
Wu

(10) Patent No.: US 7,369,630 B2
(45) Date of Patent: May 6, 2008

(54) FAST WALSH TRANSFORM (FWT) DEMODULATOR AND METHOD THEREOF

(75) Inventor: Mau-Lin Wu, Hsinchu (TW)

(73) Assignee: Faraday Technology Corp., Hsin-Chu (TW)

( * ) Notice: Subject to any disclaimer, the term of this patent is extended or adjusted under 35 U.S.C. 154(b) by 598 days.

(21) Appl. No.: 10/999,753

(22) Filed: Nov. 29, 2004

(65) Prior Publication Data

US 2006/0115024 A1    Jun. 1, 2006

(51) Int. Cl.
  *H03D 1/00*  (2006.01)
  *H04L 27/06*  (2006.01)
  *H04L 27/00*  (2006.01)
(52) U.S. Cl. ................ 375/343; 375/340; 375/324
(58) Field of Classification Search ........... 375/343, 375/340, 324, 136, 137, 152, 150; 704/203
See application file for complete search history.

(56) References Cited

U.S. PATENT DOCUMENTS

| | | | | |
|---|---|---|---|---|
| 6,067,315 A * | 5/2000 | Sandin | ............ | 370/252 |
| 6,154,487 A * | 11/2000 | Murai et al. | ............ | 375/150 |
| 6,882,692 B2 * | 4/2005 | Somayazulu | ............ | 375/343 |
| 7,079,592 B2 * | 7/2006 | Chang et al. | ............ | 375/316 |
| 7,200,164 B2 * | 4/2007 | Chen et al. | ............ | 375/148 |
| 2003/0058972 A1 * | 3/2003 | Iochi | ............ | 375/343 |
| 2005/0135511 A1 * | 6/2005 | Molina | ............ | 375/343 |

OTHER PUBLICATIONS

Kim et al., A Bandwidth-Power Efficient Modulation Scheme Based On Quaternary Quasi-Orthogonal Sequences, Jul. 2003, IEEE Communicationss Letters, vol. 7, Issue 7, pp. 293-295.*

* cited by examiner

*Primary Examiner*—Mohammed Ghayour
*Assistant Examiner*—Lawrence Williams
(74) *Attorney, Agent, or Firm*—Winston Hsu

(57) ABSTRACT

A fast Walsh transform (FWT) demodulator and a method are provided. The FWT demodulator includes a FWT correlator for receiving and transforming a first information based on a FWT method to output third information; power approximation devices (PAD) for receiving and calculating one of the third information to output an approximating power value respectively. Wherein, the approximating power values are divided into subgroups. A first unit of comparators selects subgroup-max-values from each subgroup. A plurality of power calculation devices (PCD) are for receiving and calculating one of the subgroup-max-value to output a precise power value respectively. A second unit of comparators is for selecting max power value from each precise power value to output a second information. By applying "PAD" to replace "PCD" into "pre-selection" subgroups with "max-and-zero" property, the invention can reduce the implementation cost without performance degradation.

11 Claims, 4 Drawing Sheets

FAST WALSH TRANSFORM (FWT) DEMODULATOR AND METHOD THEREOF

BACKGROUND OF THE INVENTION

1. Field of Invention

The present invention relates to wireless network communication device. More particularly, the present invention relates to a fast Walsh transform (FWT) demodulator.

2. Description of Related Art

In transmission media design under the wireless local area network (WLAN) 802.11b, the complementary code keying (CCK) demodulator is one of various key-control modules. The manufacturing cost of this module critically influences the overall cost of the receiving system having the same. Usually, the logic gate-count of a circuit is taken for cost estimation, and the minimum signal-to-noise ratio (SNR) needed by a specific bit error rate is taken for performance estimation of the complementary key-control module.

The FWT demodulator is an ideal one for the complementary key-control module. However, the gate-count in the conventional hardware implementation is rather high. FIG. 1 is a block diagram, schematically illustrating a FWT demodulator used in a usual very large scale integrated (VLSI) circuit. In FIG. 1, it includes a FWT operation circuit 102, a power calculation unit 104, a first-stage comparing unit 106, a second-stage comparing unit 108, a third-stage comparing unit 110, a fourth-stage comparing unit 112, a circulation comparator 114, a differential quadrature phase shift keying (DQPSK) demodulator 116.

The output of the correlator is the 16 outputs of the FWT operation circuit 102. The power calculation unit 104 is composed of 16 power calculation devices (PCD), and the PCD is used to calculate the output power of the FWT operation circuit 102. Therefore, the output of the FWT operation circuit 102 is a complex quantity, which can be expressed as Cout=Cout_RE+j*Cout_IM, wherein Cout is the output of the FWT operation circuit 102, and Cout_RE and Cout_IM respectively represent the real part and the imaginary part of the Cout. The precise power calculation (PWR) can be expressed by Equation (1):

$$PWR = Cout\_RE^2 + Cout\_IM^2. \quad (1)$$

Here, Cout_RE is assumed to have WL bits, and therefore each power calculation device (PCD) needs two square operation circuits (or a multiplier) in WL bits, and an adder with 2*WL bits.

The first-stage comparing unit 106 is composed of 8 comparators, the second-stage comparing unit 108 is composed of 4 comparators, the third-stage comparing unit 110 is composed of 2 comparators, and the fourth-stage comparing unit 112 is composed of 1 comparator. The comparing units 106-112 are used to compare the 16 output power values from the correlator (102) one to one, so as to find the maximum power in these 16 power values. In accordance with the foregoing 4 times of calculation and comparing procedures, the circulation comparator 114 further compares the maximum powers obtained from the 4 procedures, to obtain the maximum value. Then, the differential quadrature phase shift keying (DQPSK) demodulator 116 receives the output of maximum power in the correlator 112 that is provided by the circulator 114 and the previous output of the correlator. The outputs of the circulation comparator 114 and the DQPSK demodulator 116 is the operation result of the FWT demodulator 100, which is the output signal CRDM_FWT_ROUT in FIG. 1.

As described above, the power calculation unit is an essential part being used to measure the output power of the FWT demodulator. Since each power calculation unit is composed of 2 square circuits (multiplier) and 1 adder, the FWT demodulator 100 having 16 power calculation units shown in FIG. 1 needs 32 multipliers and 16 adders in total. Since the circuit area of the multiplier is relatively larger (cost is higher), the cost to implement the FWT demodulator in the VLSI circuit is relative high.

SUMMARY OF THE INVENTION

In an objective, the invention provides a FWT demodulator for reducing the hardware cost.

In another objective, the invention provides a FWT demodulating method, for replacing the power calculation with a power approximation calculation in a simple way, to effectively reduce the cost of the FWT demodulator.

The invention provides a FWT demodulator, used to receive and demodulate a first information and exports a second information. The FWT demodulator includes a FWT correlator, power approximation devices, a first comparing unit, power calculation devices, and a second comparing unit. The FWT correlator receives the first information and transforms the first information by the FWT method, to export a third information. Several power approximation devices are coupled to the FWT correlator, for respectively receiving and calculating the corresponding one of the third information, and respectively exporting the approximate power values. The first comparing unit is coupled to power approximation devices, wherein the approximate power values are divided into multiple subgroups. The first comparing unit is used to respectively find the maximum value in the subgroups. Each of the power calculation devices is coupled to the first comparing unit, for respectively receiving and calculating the maximum values corresponding to the subgroups, and respectively exporting the precise power values. The second comparing unit is coupled to each of the power calculation devices, for finding the maximum power value from the precise power values, and exporting a second information. Wherein, the number of the power calculation devices is less than the number of the power approximation devices.

In accordance with an embodiment of the FWT demodulator of the invention, calculating and obtaining the individual approximate power value for each of the foregoing power approximation devices can follows the equation of APWR=2*max(|Cout_RE|, |Cout_IM|)+min(|Cout_RE|, |Cout_IM|). And, calculating and obtaining the individual precise power values in the power calculation devices can follow the equation of PWR=Cout_RE$^2$+Cout_IM$^2$. Wherein, APWR represents the approximate power value and PWR represents the precise power value, Cout_RE and Cout_IM respectively represent the real part and the imaginary part of the received information. The symbols of max( ) and min( ) represent taking the maximum value and taking the minimum value.

In accordance with an embodiment of the FWT demodulator of the invention, the approximate power values in the foregoing subgroups are normal to each other.

The invention provides a FWT demodulating method, for demodulating a first information and exporting a second information. The demodulating method includes the following steps. First, the first information is transformed according to the FWT algorithm, so that several third information are obtained. The approximate calculation method is used to calculate the third information, so as to obtain the approximate power values. The approximate power values are divided into several subgroups. A subgroup maximum value of the approximate power values in each of the subgroups is found out. Then, a precise power calculation method is used to precisely calculate the maximum value in each subgroup, so as to obtain multiple precise power values. Then, a maximum of the precise power values is obtained, so as to export a second information. Wherein, the number of the precise power values is less than the number of the approximate power values.

Since the invention uses the PAD with smaller circuit size to replace the PCD with larger circuit size, and the specific properties of max-and-zero in the FWT correlator to form pre-selection subgroups. With the two-stage power calculation structure, the actual cost of the FWT demodulator is significantly reduced, and the performance can still remain.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
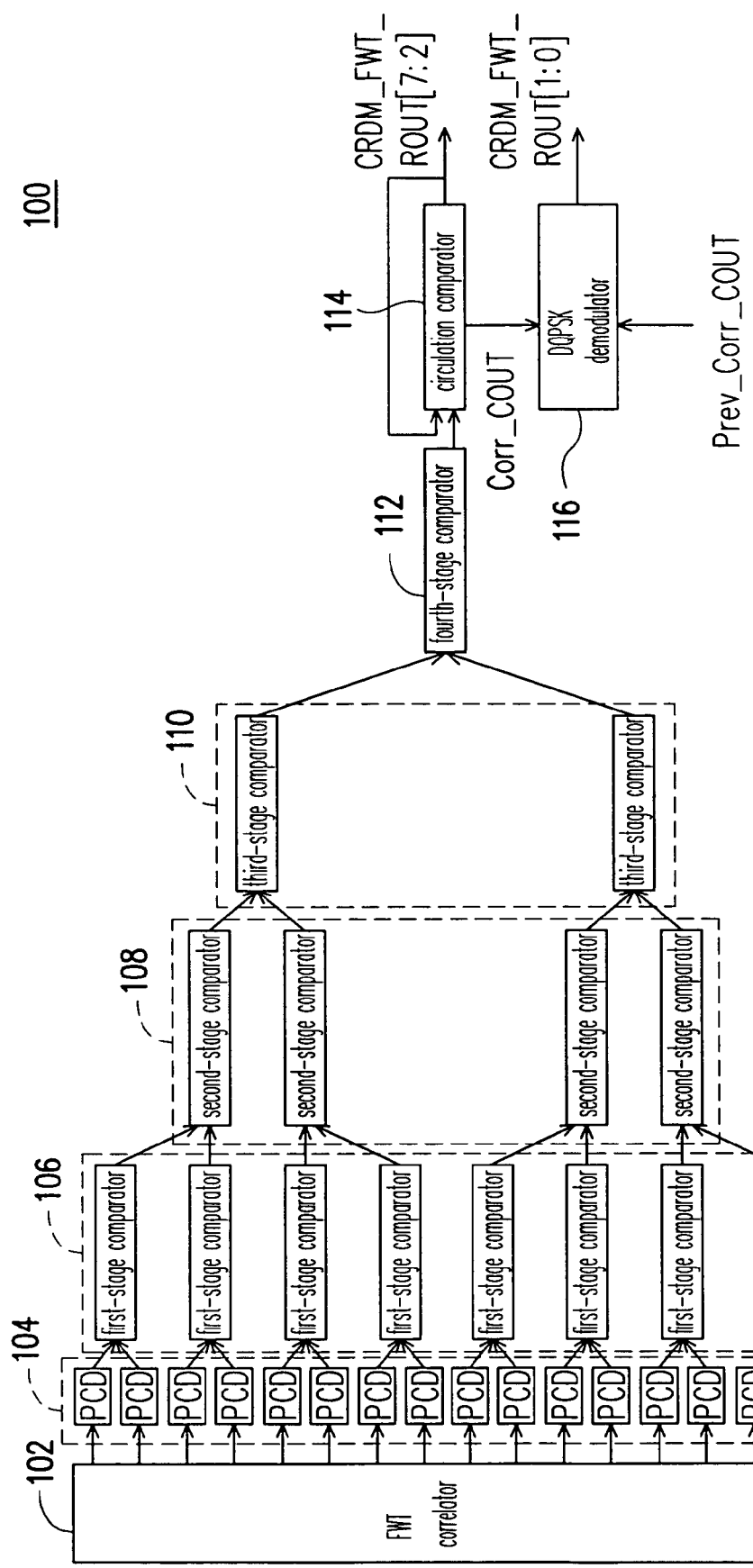
FIG. 1 is a block diagram, schematically illustrating a conventional FWT demodulator used in a very large scale integrated (VLSI) circuit.
Figure 2A:
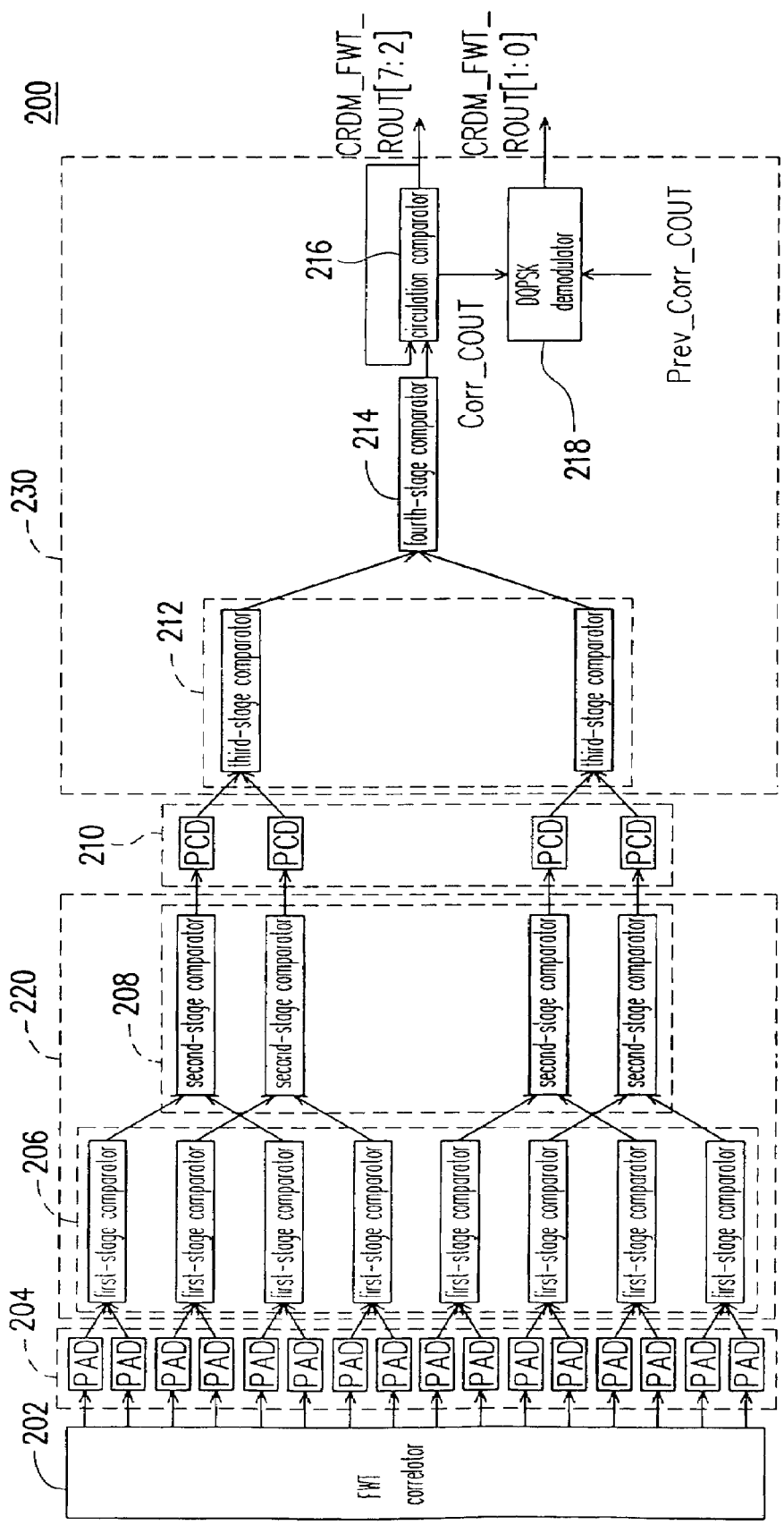
FIG. 2A is a block diagram, schematically illustrating a FWT demodulator with low cost, according to a preferred embodiment of the invention.

FIG. 2A is a block diagram, schematically illustrating a FWT demodulator with low cost, according to a preferred embodiment of the invention. In FIG. 2A, the FWT demodulator 200 of the invention includes a FWT correlator 202, a power approximate unit 204, a first comparing unit 220, a power calculation unit 210 and a second comparing unit 230. Usually, the output of the FWT correlator 202 is a complex quantity, which can be expressed by Cout=Cout_RE+ j*Cout_IM, in which Cout_RE and the Cout_IM respectively represent the real part and the imaginary part. The FWT can be known by the ordinary skilled in the art, and therefore the FWT correlator 202 is not further described.

The power approximate unit 204 plays an essential role in the FWT demodulator. The power approximate unit 204 is formed by, for example, 16 power approximation devices (PAD's), for respectively receiving one of the output information of the FWT correlator 202, and calculating the approximate power value. In the embodiment, the approximate power value exported from each of the PAD's is APWR=2*max(|Cout_RE|, |Cout_IM|)+min(|Cout_RE|, |Cout_IM|). Cout_RE and the Cout_IM respectively represent the real part and the imaginary part and max( ) and min( ) respectively represent taking the maximum and the minimum.

According to the calculation equation in the power approximate unit 204, when Cout_RE is assumed to have WL bits, then each of the PCD's can have a comparator and an adder with (WL+1) bits. In comparing with the conventional technique, the actual cost of the invention can be obviously reduced.

However, since the approximate power value APWR is only an approximate value, this may cause the decrease of performance. In order to avoid the low performance, the invention provides a two-stage power calculation structure, in accordance with the specific properties of max-and-zero in the FWT correlator to form pre-selection subgroup, so that even though the actual cost of the FWT demodulator is significantly reduced, the performance can still remain.

In embodiment, 16 PAD blocks are used to calculate the 16 approximate values exported from the FWT correlator 202. According to the property of max-and-zero of the FWT demodulator, the 16 outputs of the correlator are divided into 4 different subgroups, wherein each of the subgroups are orthogonal to each other in a vector inner-product operation. This property is described later.

In the embodiment, the first comparing unit 220 can include a first-stage comparing unit 206 and a second-stage comparing unit 208. The first comparing unit 206 is, for example, composed of 8 comparators, and the second-stage comparing unit 208 is composed of, for example, 4 comparators. Based on the approximate power values and by using the first-stage comparing group 206 and a second-stage comparing unit 208, each subgroup has a maximum approximate value exported from the correlator is selected as the candidate value. The remaining four output values from the FWT correlator 202 through the comparison in the first comparing unit 220 are respectively applied to 4 power calculation devices (PCD) for precisely calculating the power values. Wherein, the precise power value PWR=Cout_RE$^2$+Cout_IM$^2$, Cout_RE and Cout_IM are the real part and the imaginary part, received by PCD.

In the embodiment, the second comparing unit 230 can include a third-stage comparing unit 212, a fourth-stage comparing unit 214, and circulation comparing unit 216. Based on the precise power values and by using the third-stage comparing unit 212 and the fourth-stage comparing unit 214, a candidate maximum value is selected in each cycle for the FWT correlator 202. The same operation is performed in every four cycles, and the circulation comparing unit 216 compares the candidate values selected from each cycle. The probable maximum value exported from the FWT correlator 202 is selected from the 4 candidate values. The output of the FWT demodulator 200 is then determined.

In the following descriptions, the property of max-and-zero and the reason why the structure of invention does not reduce the performance are described.

Figure 2B:
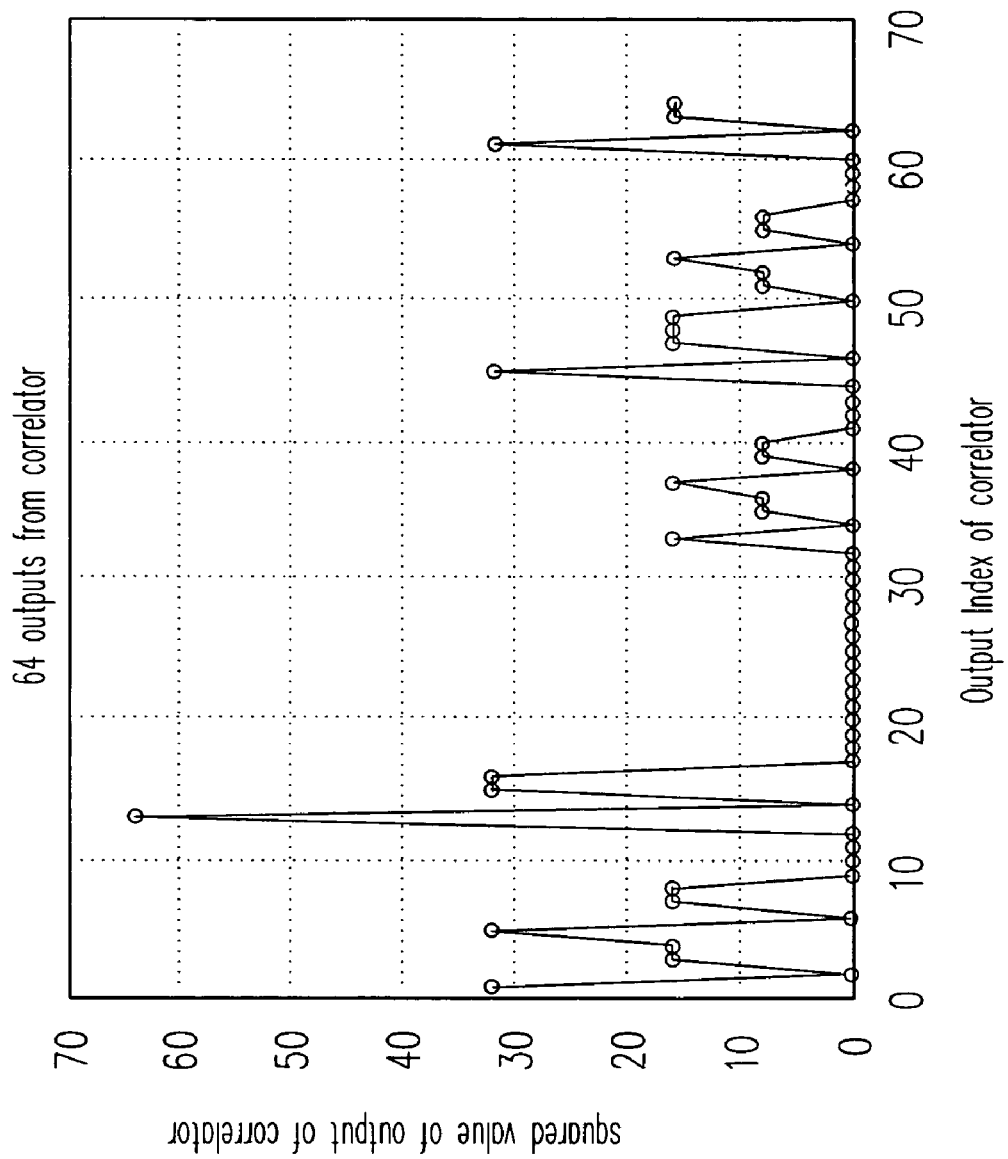
FIG. 2B is a block diagram, schematically illustrating the output of the 64 outputs of correlator in a FWT demodulator with low cost, according to a preferred embodiment of the invention.

As shown in FIG. 2A, it has four subgroups with the property of max-and-zero, due to the FWT demodulator. It is assumed in FIG. 2A that the 16 outputs of the FWT correlator 202 are indexed by 1-16 from top to bottom. These four subgroups are {1, 2, 5, 6}, {3, 4, 7, 8}, {9, 10, 13, 14}, and {11, 12, 15, 16}. It assumed that an ideal waveform of the complementary code keying (CCK) is fed to the FWT correlator 202. When the outputs from the correlator in the same subgroup has a maximum power value, then the other three outputs of the correlator are then "0". This property is shown in FIG. 2B. In FIG. 2B, the output from the correlator, indexed by 13, has the maximum power value with quantity of 64, and the other 3 outputs of the correlator in the same subgroup (indexed by 9, 10, and 14) has the power values of "0".

According to the specification of 802.11b standard (1999) made by Institute of Electrical and Electronic Engineers (IEEE), the CCK method is:

$$C=\{e^{j(\phi_1+\phi_2+\phi_3+\phi_4)}, e^{j(\phi_1+\phi_3+\phi_4)}, e^{j(\phi_1+\phi_2+\phi_4)}, -e^{j(\phi_1+\phi_4)}, e^{j(\phi_1+\phi_2+\phi_3)}, e^{j(\phi_1+\phi_3)}, -e^{j(\phi_1+\phi_2)}, e^{j\phi_1}\},$$

and the relation between the input data type and the phase is as follows:

| Input data type | Phase |
| --- | --- |
| 00 | 0 |
| 01 | $\pi/2$ |
| 10 | $\pi$ |
| 11 | $3\pi/2$ $(-\pi/2)$ |

The forgoing properties can be proved as follows. It is assumed that the received modulating code bit of CCK is $C_R=\{c_0, c_1, c_2, c_3, c_4, c_5, c_6, c_7\}e^{j\Delta\theta}$. If the bit-stream of the reflection information of $C_R$ is $D_1=\{d_0, d_1, d_2d_3, d_4, d_5, d_6, d_7\}$, then the output value $D_1$ of the correlator becomes $8e^{j\Delta\theta}$. The output values of $D_2, D_3, D_4$ can be proved as zero, wherein the $D_1, D_2, D_3, D_4$ are in the same subgroup. $D_2=\{d_0, d_1, d_2, d_3, 1-d_4, d_5, d_6, d_7\}$, $D_3=\{d_0, d_1, d_2, d_3, d_4, d_5, 1-d_6, d_7\}$, and $D_4=\{d_0, d_1, d_2, d_3, 1-d_4, d_5, 1-d_6, d_7\}$. If the $C_i$ and $D_i$ are modulating code bit of CCK, according to the IEEE 802.11b Standard, the phase difference of $\phi_3$ between $D_1$ and $D_2$ is 180 degrees.

According to the foregoing properties, these modulating code bit of CCK are $C_1=\{c_0, c_1, c_2, c_3, c_4, c_5, c_6, c_7\}$, $C_2=\{-c_0, -c_1, c_2, c_3, c_4, -c_5, c_6, c_7\}$, $C_3=\{-c_0, -c_1, -c_2, -c_3, c_4, c_5, c_6, c_7\}$, $C_4=\{c_0, -c_1, c_2, c_3, c_4, -c_5, c_6, c_7\}$. Therefore, since $c_i$ is +1, −1, +j, or −j, the output of correlator for $C_2$ is $C1\times C2^*=(-c_0c_0^*-c_1c_1^*+c_2c_2^*+c_3c_3^*-c_4c_4^*-c_5c_5^*+c_6c_6^*+c_7c_7^*)e^{j\Delta\theta}=(-1-1+1+1-1-1+1+1)e^{j\Delta\theta}=0$. By the similar foregoing procedure, the outputs of correlator for C3 and C4 can be proved to be zero.

Due to the property of the max-and-zero of the FWT demodulator, the output of correlator with the maximum power value is almost remaining in the original subgroup. The effect of using the approximate power values for comparing does not affect the result. In order to compare the 4 remaining candidate values in each cycle, the precise calculation on the power values is necessary. This is because the property of max-and-zero does not exist between the 4 candidate values. Then, it needs 4 precise power calculation devices (PCD) to avoid the decrease of performance. If only the power approximate devices are used in the FWT demodulator, the decrease of performance is obvious.

Figure 3:
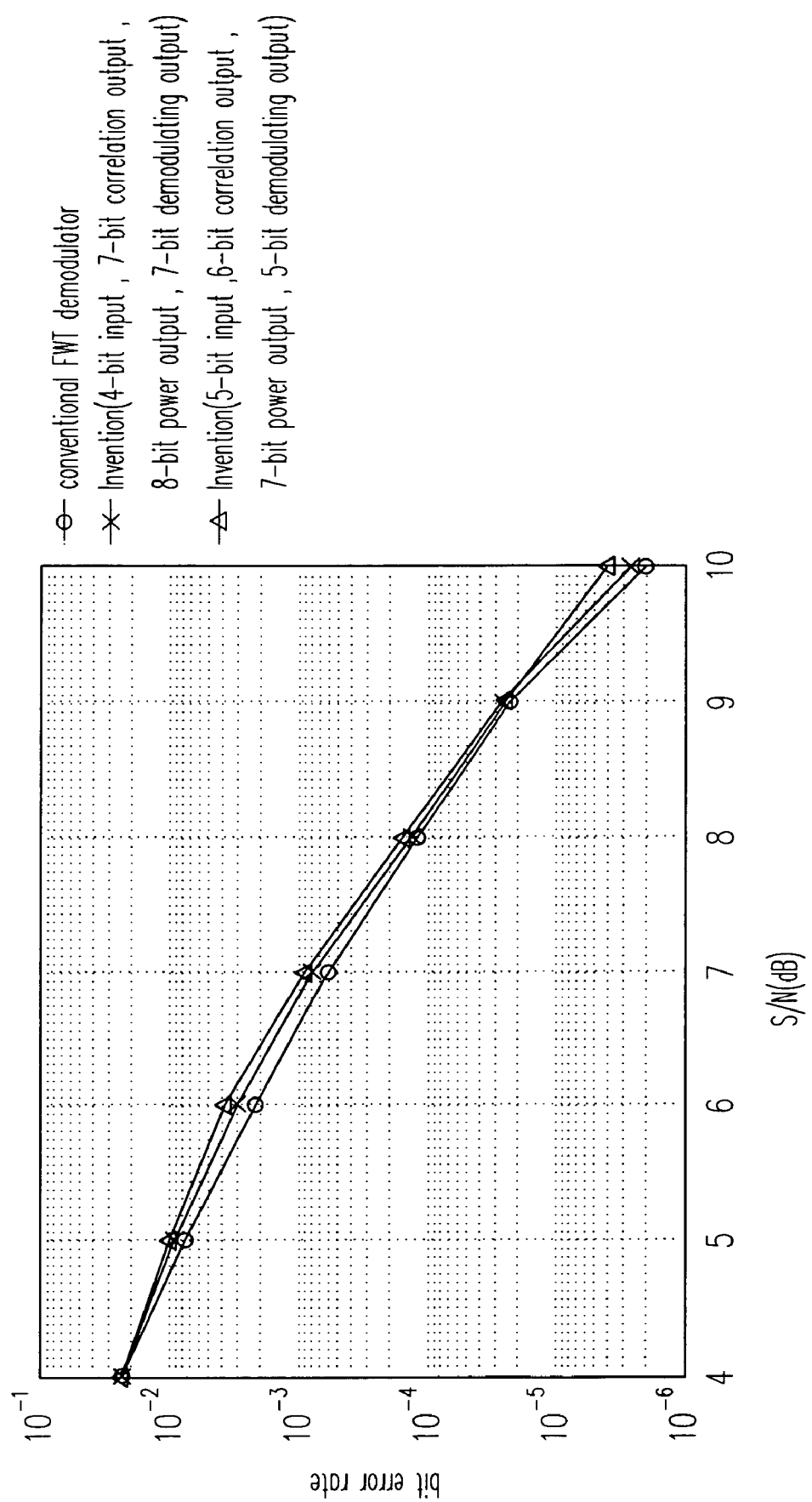
FIG. 3 is a performance drawing for schematic comparison between conventional FWT and the FWT of the invention.

Even though the 4 precise PCD's are needed, the cost of the invention is still significantly less than the cost of the conventional FWT demodulator. In the invention, the gate count can be reduced by 40%. For example, the usual gate count for the conventional FWT demodulator is 20,000, and now the gate count can be reduced to 12,000. Also, the performance can almost remain as usual, as shown in FIG. 3, which is a performance drawing for schematic comparison between conventional FWT and the FWT of the invention. In Figure, the vertical axis represents the bit error rate and the horizontal axis represents the signal to noise (S/N) ratio, wherein the minimum requirement of S/N is 9.5 dB.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A fast Walsh transform (FWT) demodulator, used for receiving a first information and exporting a second information, the FWT demodulator comprising:
   a FWT correlator, for receiving the first information and transforming the first information into a plurality of third information based on a FWT algorithm;
   a plurality of power approximate devices, coupled to the FWT correlator, and respectively receiving and calculating one of the third information to respectively export approximate power values;
   a first comparing unit, coupled to the power approximate devices, wherein the approximate power values are divided into a plurality of subgroups, and the first comparing unit obtains a group maximum value for each of the subgroups;
   a plurality of power calculation devices, coupled to the first comparing unit, for respectively receiving and calculating the group maximum values for the corresponding subgroups, and respectively exporting precise power values; and
   a second comparing unit, coupled to the power calculation devices, for obtaining a power maximum value from the precise power values and exporting the second information,
   wherein the number of the power calculation devices is less than the number of the power approximate devices.

2. The FWT demodulator of claim 1, wherein each of the power approximate devices calculates and obtains the approximate power value by a formula of:

APWR=2*max(|Cout_RE|, |Cout_IM|)+min (|Cout_RE|, |Cout_IM|), wherein APWR represents one of the approximate power values Cout_RE and Cout_IM respectively represent a real part and an imaginary part of the third information, and max( ) and min( ) respectively represent operations of taking maximum and taking minimum.

3. The FWT demodulator of claim 1, wherein each of the power calculation devices calculates and obtains the precise power value by a formula of:

PWR=Cout_RE2+Cout_IM2 wherein PWR represents the precise power value, Cout_RE and Cout_IM respectively represent a real part and an imaginary part of the group maximum value.

4. The FWT demodulator of claim 1, wherein the approximate power values of the subgroups are orthogonal to each other.

5. The FWT demodulator of claim 1, wherein the first comparing unit comprising:
   a plurality of first-stage comparators, each of the first-stage comparators receiving and comparing corresponding two of the approximate power values, and exporting a larger one of the two as a first-stage maximum value; and
   a plurality of second-stage comparators, each of the second-stage comparators receiving and comparing corresponding two of the first-stage maximum values, and exporting a larger one of the two as a second-stage maximum value, wherein each of the second-stage maximum values is a maximum value of the approximate power values corresponding to the subgroups.

6. The FWT demodulator of claim 1, wherein the second comparing unit comprises:
a plurality of third-stage comparators, each of the third-stage comparators receiving and comparing corresponding two of the precise power values, and exporting a larger one of the two as a third-stage maximum value;
at least one fourth-stage comparator, each of the fourth-stage comparator receiving and comparing corresponding two of the third-stage maximum values, and exporting a larger one of the two as a fourth-stage maximum value; and
a circulation comparator, coupled to the fourth-stage comparator, for receiving the fourth-stage maximum value and comparing with a previous circulation result, so as to obtain a comparing result of current circulation, wherein according the comparing result of current circulation, the second information is obtained.

7. The FWT demodulator of claim 6, wherein the second comparing unit further comprising a complex multiplier, for receiving the one of the third information with the maximum power value and multiplying a previous correlating value, and exporting a multiplying result, wherein the second information is obtained further according to the comparing result of current circulation and the multiplying result.

8. The FWT demodulator of claim 7, wherein the complex multiplier is a Differential Quadrature Phase Shift Keying (DQPSK) demodulator.

9. A fast Walsh transform (FWT) demodulating method, used for demodulating a first information and exporting a second information, the demodulating method comprising:
transforming the first information, based on a FWT algorithm, to obtain a third information;
calculating the third information based on an approximate power calculating algorithm, to obtain a plurality of approximate power values;
dividing the approximate power values into a plurality of subgroups;
finding a group maximum value from the approximate power values in each of the subgroups;
obtaining a plurality of precise power values by calculating the group maximum values with a precise calculation algorithm; and
finding a power maximum value from the precise power values, and exporting the second information,
wherein the number of the precise power values is less than the number of the approximate power values.

10. The FWT demodulating method of claim 9, wherein the approximate power values are calculated by a formula of:

$$APWR = 2*\max(|Cout\_RE|, |Cout\_IM|) + \min(|Cout\_RE|, |Cout\_IM|),$$

wherein APWR represents one of the approximate power values, $Cout\_RE$ and $Cout\_IM$ respectively represent a real part and an imaginary part of the third information, and max( ) and min( ) respectively represent operations of taking maximum and taking minimum.

11. The FWT demodulating method of claim 9, wherein the precise power value is calculated by a formula of:

$$PWR = Cout\_RE2 + Cout\_IM2,$$

wherein PWR represents the precise power value, $Cout\_RE$ and $Gout\_IM$ respectively represent a real part and an imaginary part of the group maximum value.

* * * * *